United States Patent
Albrecht et al.

(10) Patent No.: US 6,234,522 B1
(45) Date of Patent: May 22, 2001

(54) HYBRID GAS GENERATOR FOR AN AIR BAG WITH A MECHANICAL OPENING MECHANISM FOR THE STORAGE CHAMBER

(75) Inventors: Uwe Albrecht, Nurnberg; Anton Bretfeld, Furth; Hosef Kraft, Berg; Jiang Zhang, Nurnberg, all of (DE)

(73) Assignee: Dynamit Nobel GmbH Explosivstoff-und Systemtechnik, Troisdorf (DE)

( * ) Notice: Subject to any disclaimer, the term of this patent is extended or adjusted under 35 U.S.C. 154(b) by 0 days.

(21) Appl. No.: 09/269,106
(22) PCT Filed: Sep. 18, 1997
(86) PCT No.: PCT/EP97/05111
  § 371 Date: Jun. 11, 1999
  § 102(e) Date: Jun. 11, 1999
(87) PCT Pub. No.: WO98/12078
  PCT Pub. Date: Mar. 26, 1998

(30) Foreign Application Priority Data

Sep. 21, 1996 (DE) ............................................. 196 38 838

(51) Int. Cl.[7] ................................................. B60R 21/26
(52) U.S. Cl. ............................................................ 280/737
(58) Field of Search .................................. 280/737, 736, 280/740, 741, 742

(56) References Cited

U.S. PATENT DOCUMENTS

| | | | |
|---|---|---|---|
| 5,226,667 | * 7/1993 | Coultas | 280/736 X |
| 5,564,740 | * 10/1996 | Zakula | 280/737 |
| 5,630,619 | * 5/1997 | Buchanan et al. | 280/741 |
| 5,709,406 | * 1/1998 | Buchanan | 280/737 |
| 5,934,705 | * 8/1999 | Siddiqui et al. | 280/736 |
| 5,970,880 | * 10/1999 | Perotto | 280/741 X |

FOREIGN PATENT DOCUMENTS

19653783 * 6/1998 (DE) .
98/28169 * 7/1998 (WO) .

* cited by examiner

Primary Examiner—Brian L. Johnson
Assistant Examiner—Bryan Fischmann
(74) Attorney, Agent, or Firm—Antonelli, Terry, Stout, Kraus, LLP

(57) ABSTRACT

A hybrid gas generator for an air bag (1) including ignitable gas-producing solid charge (5) placed in combustion chamber, a storage chamber (9) containing a gas (10) and a closed by a first bursting disk (8), a breakable separating wall (13) limiting the combustion chamber, which is connected to a hollow sliding piston (7) to perforate the first bursting disk (8) and a second bursting disk (12) in the separating wall (13) between the combustion chamber and the cavity (14) of the sliding piston (7). In order to construct the generator in a simpler and more economical form, the solid charge (5) is placed in a pyrotechnic cartridge that can be mounted separately the separating wall (13) forms the frontal border of the cartridge (3), a round notch (6) is placed on the round wall of the cartridge (3) serving as predetermined breaking point to break the separating wall (13) and the second bursting disk (12) is formed by a thinning on the separating wall (13).

5 Claims, 4 Drawing Sheets

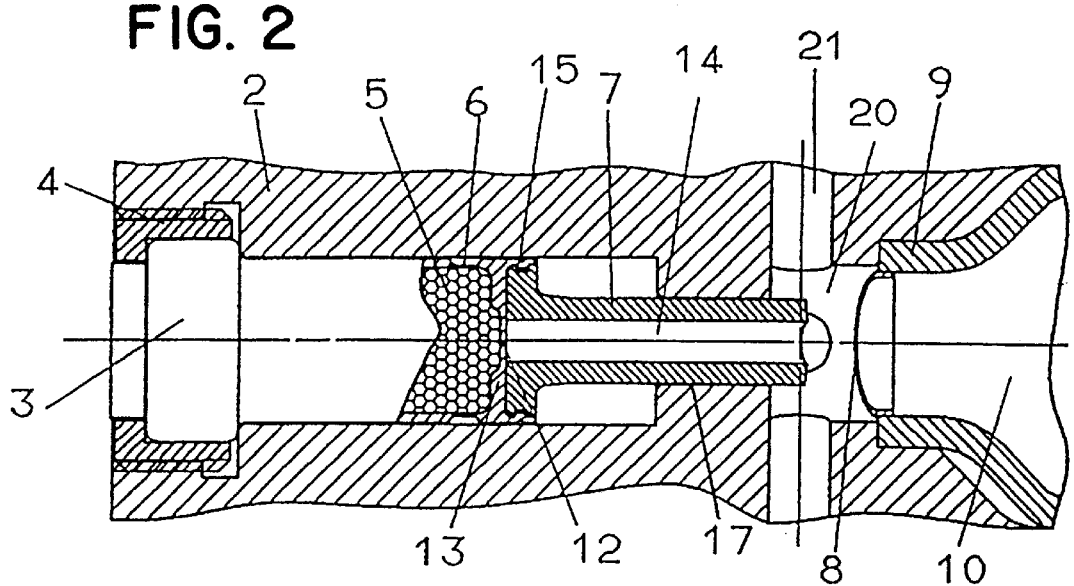
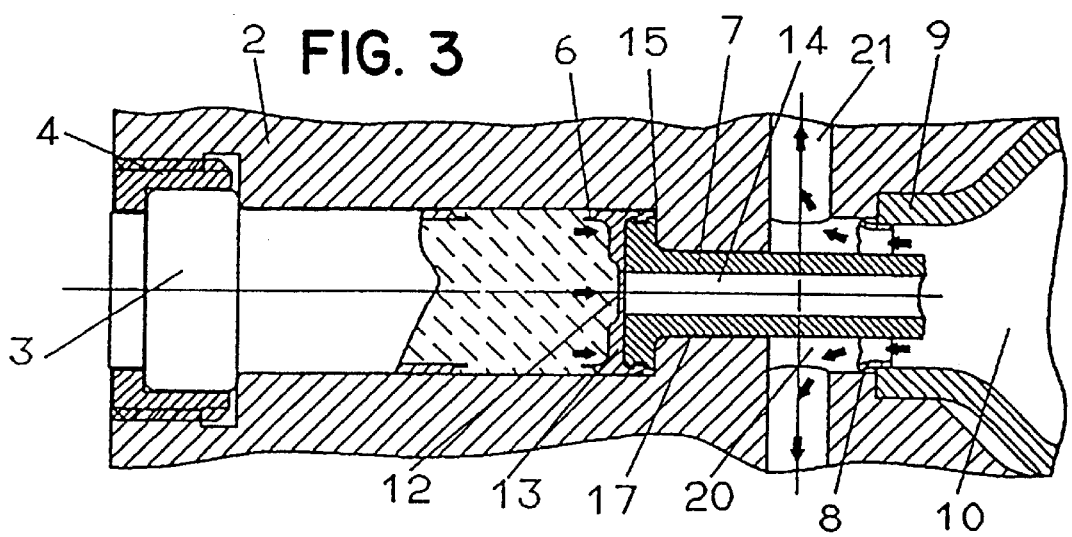
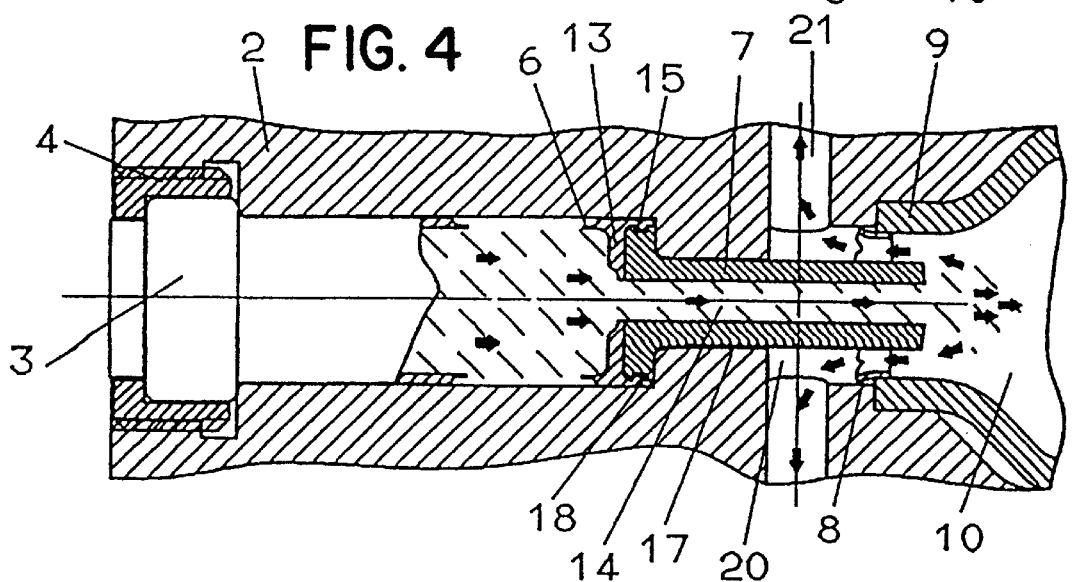

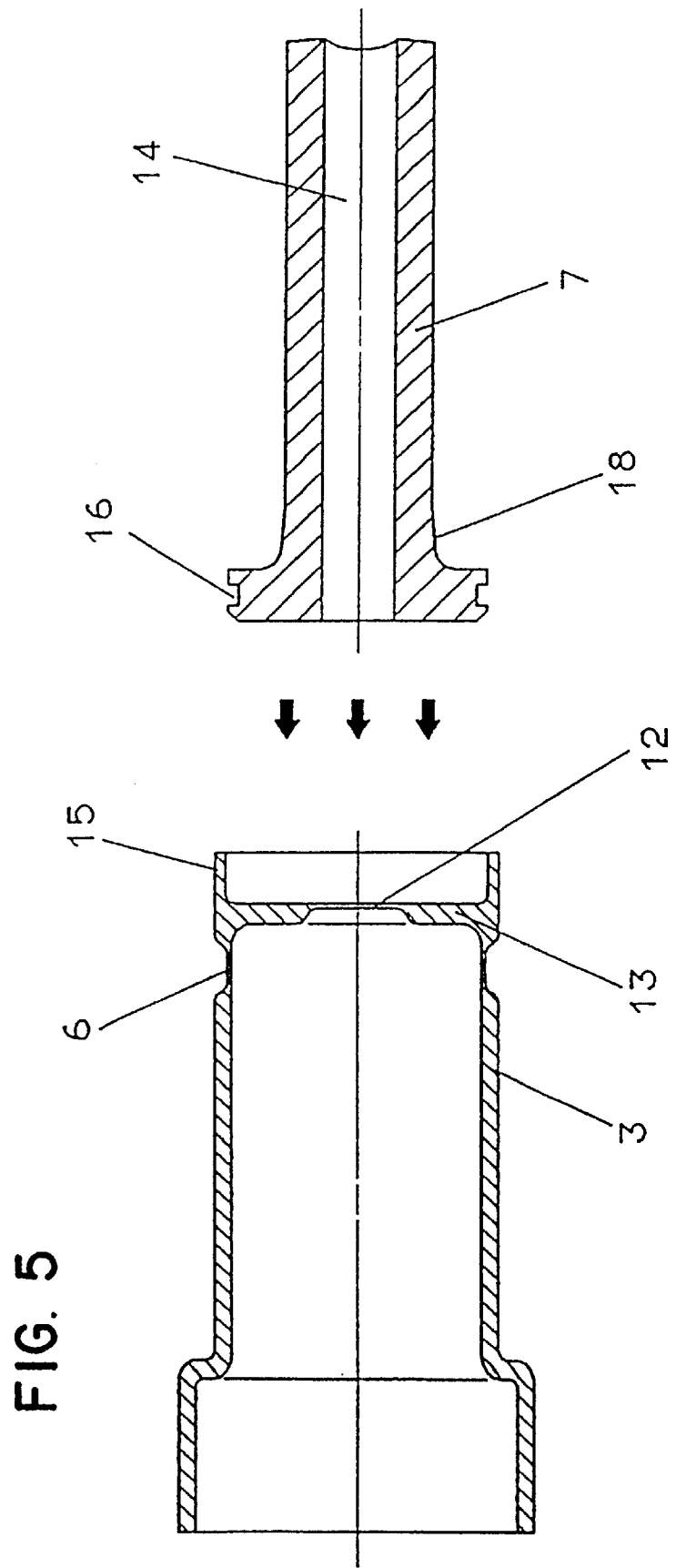

US 6,234,522 B1

HYBRID GAS GENERATOR FOR AN AIR BAG WITH A MECHANICAL OPENING MECHANISM FOR THE STORAGE CHAMBER

BACKGROUND OF THE INVENTION

The invention relates to a hybrid gas generator for an air bag.

From EP 0 616 578 B1 a hybrid gas generator of the generic type with a storage chamber for gas is known, with the storage chamber being sealed by a first bursting disk. An ignitable, gas-generating solid fuel charge is arranged in a combustion chamber. A separating wall, which limits the combustion chamber and which can be torn away, is connected to a hollow sliding piston for piercing the first bursting disk. A second bursting disk is arranged in the separating wall between the combustion chamber and the cavity of the sliding piston. Upon the ignition of the gas-generating solid fuel charge, the separating wall with the sliding piston tears away from the combustion chamber as a result of the pressure which builds up, and the point of the sliding piston punctures the first bursting disk to the storage chamber. Thereupon, cold gas can reach a gas bag by way of exit openings. The second bursting disk in the separating wall bursts under the pressure which continues to build up in the combustion chamber, and hot gas flows into the storage chamber and heats the stored gas there.

A disadvantage of this is the very costly construction which makes economical manufacture difficult.

SUMMARY OF THE INVENTION

The object of the invention is to construct a hybrid gas generator more simply and therefore more economically. The gas generator should only consist of a few assemblable modules.

In accordance with the invention, the object is achieved
- by the solid fuel charge being arranged in a pyrotechnic cartridge which can be installed separately,
- by the separating wall forming the front boundary of the cartridge,
- by a peripheral chamfer being arranged as predetermined breaking point on the peripheral wall of the cartridge for the tearing-off of the separating wall and
- by the second bursting disk being a thinning in the separating wall.

By means of these measures, the sliding piston with the pyrotechnic cartridge is integrated in simple construction to form a module.

In an advantageous development, the peripheral wall of the cartridge rises above the separating wall as an axially extended holding band, and the sliding piston is embedded with its end which faces the separating wall between the separating wall and the holding band.

This embedding can be effected in two advantageous ways. In a first embodiment, the sliding piston has at its end facing the separating wall a peripheral groove, into which the holding band is pressed or rolled. In a second embodiment, the sliding piston is connected to the separating wall by means of beading of the holding band around the end of the sliding piston which faces the separating wall.

So that the sliding piston is stopped in its extended position after the first bursting disk has been punctured, the sliding piston is conically constructed at its end which faces the separating wall, with an excess which is radial with respect to the diameter of the piston guide mechanism.

BRIEF DESCRIPTION OF THE DRAWINGS

Further features are evident from the figures which are described in the following.

FIG. 2 shows the opening mechanism of FIG. 1 on an enlarged scale, with the sliding piston in the starting position.

FIG. 3 shows the sliding piston in the end position, with destroyed first bursting disk and intact second bursting disk.

FIG. 4 shows the sliding piston in the end position, with destroyed first and second bursting disks.

FIG. 5 shows the securing of the sliding piston on the cartridge by way of a holding band which is pressed or rolled into a groove.

DETAILED DESCRIPTION OF THE INVENTION

Figure 1:
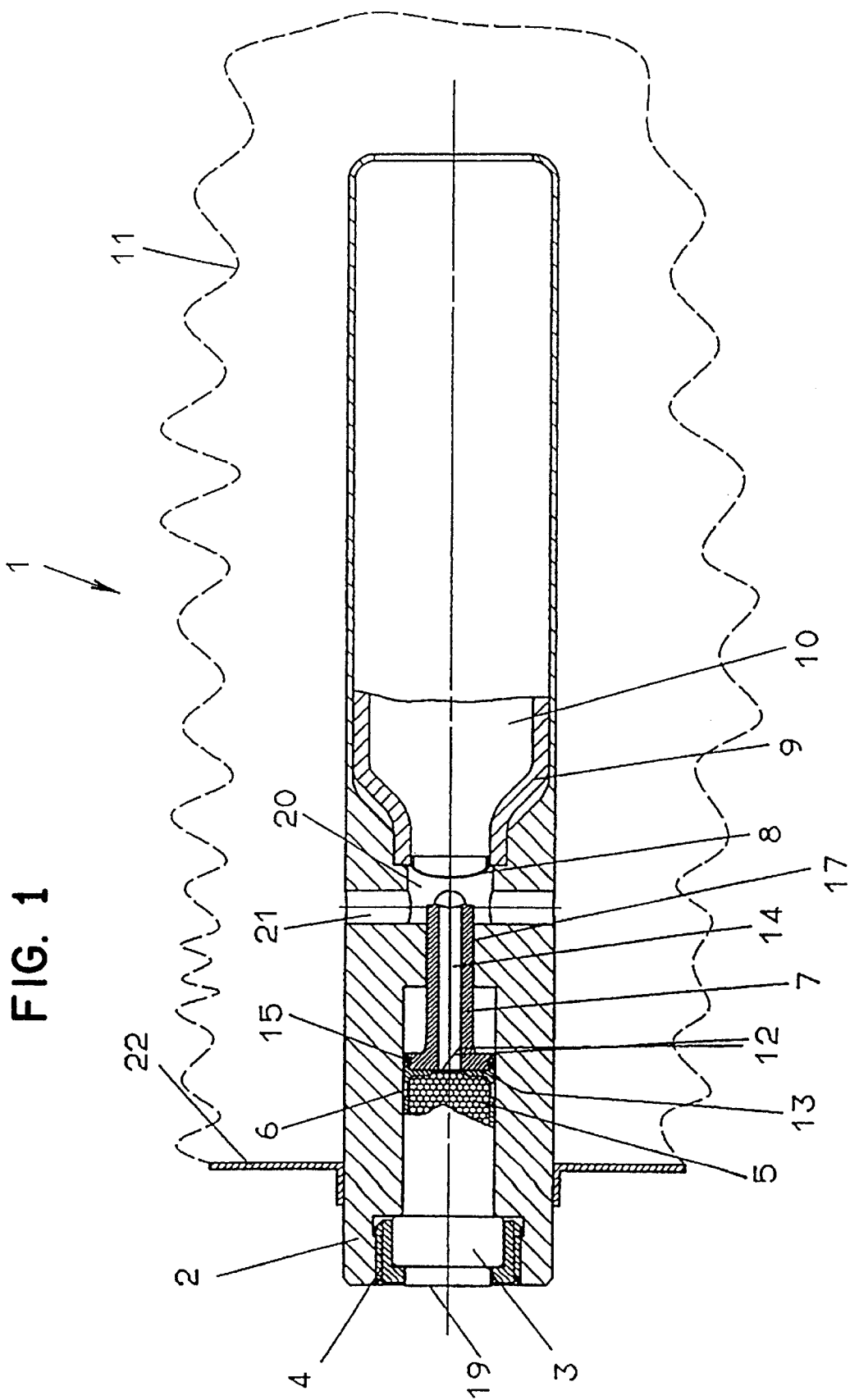
FIG. 1 shows a hybrid gas generator in accordance with the invention for an air bag, with the essential components shown in section before the tripping.

FIG. 1 shows a hybrid gas generator in accordance with the invention for an air bag 1 with its essential components shown in section. A storage chamber 9 for gas 10 is inserted into a cylindrical housing 2. The storage chamber 9 is sealed at its opening side with a first bursting disk or opening diaphragm 8. A pyrotechnic cartridge 3 is inserted opposite this first bursting disk 8 by way of a lock nut 4. Apart from an ignitable, gas-generating solid fuel charge 5, there is an ignition element in this cartridge 3, which ignition element is not shown. The ignition element can be initiated, and the solid fuel charge can therefore be ignited by way of a connector which is connected to the bushing 19. The cartridge 3 is preferably manufactured economically from aluminum and, for example, by means of reshaping procedures, such as extrusion, pressing and rolling.

Figure 6:
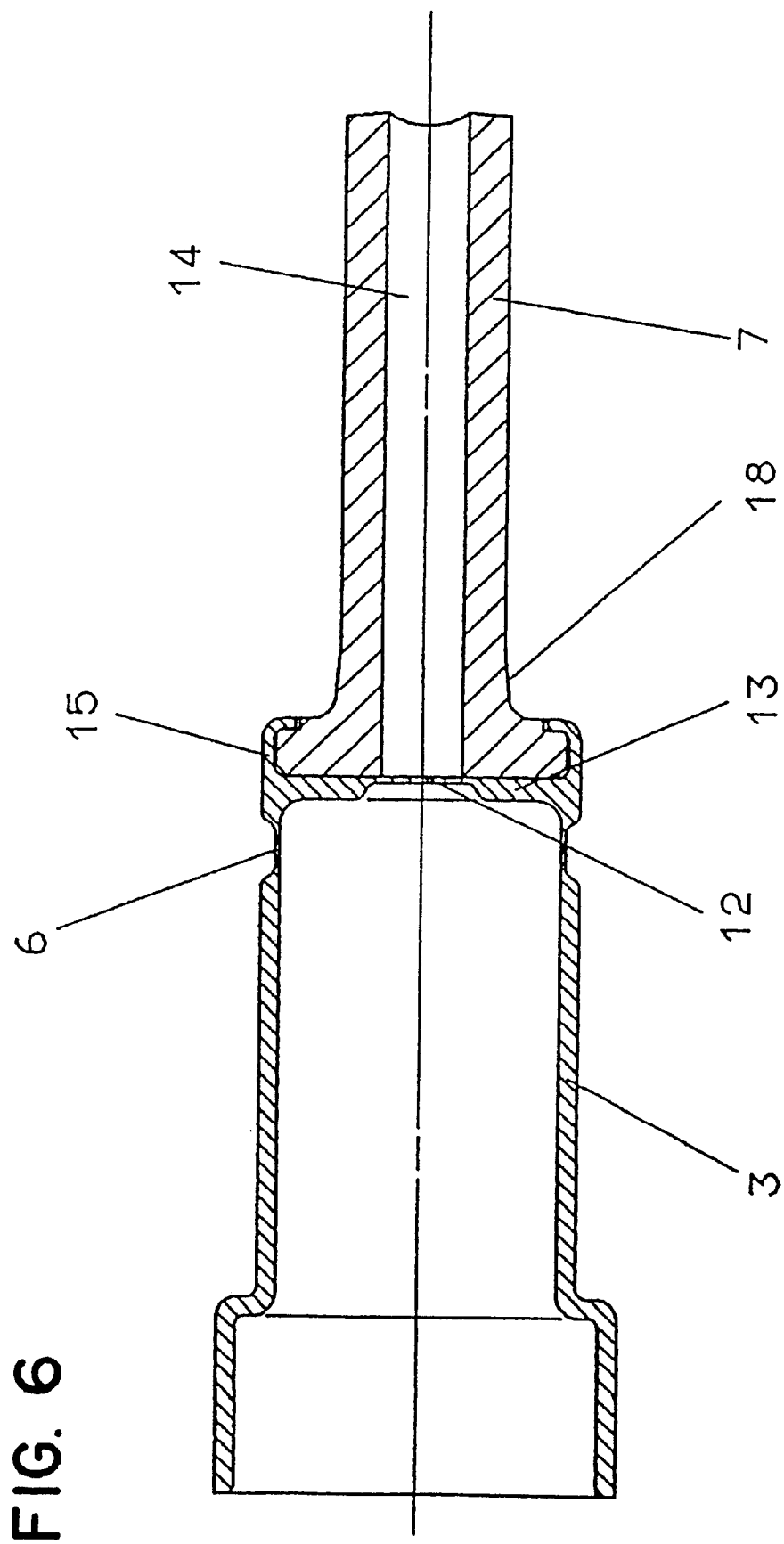
FIG. 6 shows the securing of the sliding piston on the cartridge by means of beading.

A severable separating wall 13 is arranged at the front end of the cartridge. A sliding piston 7 is secured to this separating wall 13, the sliding piston being guided in a piston guide mechanism 17. So that the separating wall 13 and therefore the sliding piston 7 can be separated off, a peripheral chamfer 6 is introduced on the peripheral wall of the cartridge 3 as predetermined breaking point. To secure the sliding piston 7 to the cartridge 3, the peripheral wall of the cartridge 3 has a holding band 15 which is extended axially with respect to the separating wall 13. Accordingly, this holding band 15 rises above the separating wall 13. The sliding piston 7 is embedded between the separating wall 13 and the holding band 15 by means of its end which faces the separating wall 13. FIGS. 5 and 6 show two alternative securing possibilities.

In FIG. 5 the sliding piston 7 has a peripheral groove 16 at its end facing the separating wall, into which groove the holding band 15 is pressed or rolled. FIG. 1 shows the completed connection.

In FIG. 6 the sliding piston 7 is connected to the separating wall 13 by means of beading of the holding band 15 around the end of the sliding piston 7 which faces the separating wall 13.

A second bursting disk 12 is formed in the separating wall 13 by thinning. The cavity 14 of the sliding piston 7, i.e. its through-passage, bounds this second bursting disk 12.

An exit area 20 is arranged in front of the first bursting disk 8, from which area passages or bores 21 lead outwardly to an air bag 11. The air bag 11 is secured at a fixing flange 22 to the housing 2.

The functioning sequence will be described in the following with reference to FIGS. 2 to 4. FIG. 2 shows the opening mechanism of FIG. 1 on an enlarged scale before tripping.

The idea underlying the invention is that, after the initiation of the hybrid gas generator, first of all cold stored gas should flow out of the exit openings 21, and only then does the hot conversion gas or the mixture of the cold stored gas and the hot conversion gas follow. The advantages of an outflow procedure established in this way are, first of all, that a great increase of the gas pressure in the stored gas area as a result of the inflow of the conversion gas is avoided and, secondly, that thermal stresses on the air bag 11 (melting, burning) by means of hot gases are reduced.

If required, the pyrotechnic cartridge 3 can be ignited electrically or mechanically. The ignition and burning characteristic is set in such away that a defined gas pressure increase is achieved in the cartridge 3. The rising gas pressure (see FIG. 3) first of all presses axially with the gas force on the sleeve floor, i.e. the separating wall 13, and tears away the peripheral chamfer 6 on the casing, separates the floor from the rest of the sleeve and slides and accelerates it with the piston 7 to the first bursting disk 8. The accelerated piston 7 punctures the bursting disk 8 with its kinetic energy and the gas sliding force acting axially on the floor. The bursting disk 8 is designed in such a way that, after the puncturing and under the action of the gas pressure of the stored gas 10, it is immediately almost completely destroyed, and in this way a larger opening area than the piston outer diameter is produced, so that the stored gas 10 can flow out through the bores 21 despite the piston having penetrated into the storage container.

The second bursting disk 12 is co-ordinated with the peripheral chamfer 6 and the gas pressure increase in the cartridge 3 in such a way that the necessary bursting pressure of the second bursting disk 12 is higher than the gas pressure in the cartridge 3 which leads to the tearing-away of the peripheral chamfer 6. The bursting and the flowing-out of the hot reaction gas through the through-hole or the cavity 14 in the piston 7 takes place with increasing gas pressure in the cartridge 3 only after the tearing-away of the peripheral chamfer 6 (separating of the sleeve floor) and after the puncturing of the bursting disk 8 upon reaching the end position of the piston 7 (FIG. 4). Only after the bursting of the bursting disk 12 does the gas pressure in the combustion area of the cartridge 3 begin to drop. Thereafter, the hot reaction gas mixes with the remaining stored gas 10 still located in the storage container 9 and flows out together with the stored gas 10 through the bores 21.

The sliding piston 7 has a conical section 18 (see FIGS. 5 and 6). In the end position (FIG. 4) the piston 7 is pressed into the cylindrical piston guide mechanism 17 because of a radial oversizing of the conical section 18. A press fit is produced. The conical section 18 therefore advantageously fulfills two tasks. The piston 7 is braked smoothly upon reaching the end position (i.e. the impact is dampened) and, because of the great self-locking, even with a possibly increased gas pressure in the region of the pressure container neck and with a simultaneously decreased gas pressure in the cartridge 3, it is not pushed back. This defined end position favors a good mixing of the reaction gas with the stored gas and reduces a fluctuation of the out-flow process.

What is claimed is:

1. Hybrid gas generator for an air bag comprising: an ignitable, gas-generating solid fuel charge arranged in a combustion chamber, a storage chamber containing a gas and sealed by a first bursting disk, a separating wall which limits the combustion chamber, which can be torn away from a remainder of the combustion chamber and which is connected to a hollow sliding piston for piercing the first bursting disk, and a second bursting disk in the separating wall between the combustion chamber and the cavity of the sliding piston, characterized in that:

the solid fuel charge is arranged in a pyrotechnic cartridge which can be installed separately, the separating wall forms a boundary of the cartridge on an end of the cartridge facing the storage chamber, on the peripheral wall of the cartridge, a peripheral chamfer is arranged as a predetermined breaking point for the tearing-off of the separating wall and the second bursting disk is a thinning in the separating wall.

2. Hybrid gas generator according to claim 1, characterized in that the peripheral wall of the cartridge extends beyond the separating wall as an axially extended holding band, and an end of the sliding piston facing the separating wall is fixed to the separating wall by the holding band.

3. Hybrid gas generator according to claim 2, characterized in that the end of the sliding piston facing the separating wall has a peripheral groove, into which the holding band is pressed or rolled.

4. Hybrid gas generator according to claim 2, characterized in that the sliding piston is connected to the separating wall by beading of the holding band around the end of the sliding piston facing the separating wall.

5. Hybrid gas generator according to one of claims 1 to 4, wherein the sliding piston is mounted displaceably in a piston guide mechanism, characterized in that the end of the sliding piston facing the separating wall is conically constructed with an oversizing which is radial with respect to the diameter of the piston guide mechanism.

* * * * *